United States Patent
Kovach et al.

(10) Patent No.: US 7,597,172 B1
(45) Date of Patent: Oct. 6, 2009

(54) GEAR BOX FOR HYDRAULIC ENERGY RECOVERY

(75) Inventors: Joseph A. Kovach, Aurora, OH (US); James H. Blalock, Olive Branch, MS (US); Steven C. Rink, Lawton, OK (US); Stacy H. Turner, Ft. Wayne, IN (US); Hao Zhang, Canfield, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 433 days.

(21) Appl. No.: 11/379,883

(22) Filed: Apr. 24, 2006

Related U.S. Application Data

(60) Provisional application No. 60/674,031, filed on Apr. 22, 2005, provisional application No. 60/764,908, filed on Feb. 3, 2006, provisional application No. 60/775,105, filed on Feb. 21, 2006.

(51) Int. Cl.
*B60K 17/356* (2006.01)
(52) U.S. Cl. ..................... 180/305; 180/306
(58) Field of Classification Search ............... 180/305, 180/306, 307, 367; 60/325, 413, 414
See application file for complete search history.

(56) References Cited

U.S. PATENT DOCUMENTS

| | | |
|---|---|---|
| 3,490,816 A | 1/1970 | Lyman |
| 3,910,043 A | 10/1975 | Clerk |
| 4,018,052 A | 4/1977 | Laussermair |
| 4,098,083 A | 7/1978 | Carman |
| 4,098,144 A | 7/1978 | Besel et al. |
| 4,171,029 A | 10/1979 | Beale |
| 4,196,644 A | 4/1980 | Orshansky, Jr. et al. |
| 4,223,532 A | 9/1980 | Shiber |
| 4,242,922 A | 1/1981 | Bandoin |
| 4,278,403 A | 7/1981 | Shafer |
| 4,351,409 A | 9/1982 | Malik |
| 4,372,414 A | 2/1983 | Anderson et al. |
| 4,399,886 A * | 8/1983 | Pollman .................... 180/197 |
| 4,441,573 A | 4/1984 | Carman et al. |
| 4,576,062 A | 3/1986 | Reppert et al. |

(Continued)

FOREIGN PATENT DOCUMENTS

EP 0047643 3/1982

(Continued)

OTHER PUBLICATIONS

Noria Nakazawa, Yoichiro Kono, Eijiro Takao, and Nobuaki Takeda, "Development of a Braking Energy Regeneration System for City Buses", SAE Technical Paper Series, Nov. 16, 1987.

(Continued)

*Primary Examiner*—Christopher P Ellis
*Assistant Examiner*—Brian Swenson
(74) *Attorney, Agent, or Firm*—Renner, Otto, Boisselle, & Sklar, LLP

(57) ABSTRACT

A hydraulic energy recovery and a mechanical drive system in one unit that also provides integral mounting of hydraulic pump/motors for primary drive, secondary drive, and pumps for cooling, lubrication, and low pressure systems along with a mounting position for a power take-off device.

34 Claims, 14 Drawing Sheets

U.S. PATENT DOCUMENTS

| | | | |
|---|---|---|---|
| 4,592,454 A | 6/1986 | Michel | |
| 4,727,772 A | 3/1988 | Sumiya et al. | |
| 4,727,774 A | 3/1988 | Sumiya et al. | |
| 4,776,233 A | 10/1988 | Kita et al. | |
| 4,778,020 A | 10/1988 | Hagin et al. | |
| 4,813,234 A | 3/1989 | Nikolaus | |
| 4,888,949 A | 12/1989 | Rogers | |
| 4,947,687 A | 8/1990 | Martini et al. | |
| 4,986,383 A | 1/1991 | Evans | |
| 5,024,489 A | 6/1991 | Tanaka et al. | |
| 5,050,936 A | 9/1991 | Tanaka et al. | |
| 5,086,865 A | 2/1992 | Tanaka et al. | |
| 5,088,041 A | 2/1992 | Tanaka et al. | |
| 5,193,416 A | 3/1993 | Kanayama | |
| 5,495,912 A | 3/1996 | Gray, Jr. et al. | |
| 5,505,113 A | 4/1996 | Weist | |
| 5,505,527 A | 4/1996 | Gray, Jr. et al. | |
| 5,507,144 A | 4/1996 | Gray, Jr. et al. | |
| 5,579,640 A | 12/1996 | Gray, Jr. et al. | |
| 5,607,027 A | 3/1997 | Puett, Jr. | |
| 5,643,125 A | 7/1997 | Long et al. | |
| 5,647,318 A | 7/1997 | Feucht et al. | |
| 5,708,312 A | 1/1998 | Rosen et al. | |
| 5,799,562 A | 9/1998 | Weinberg | |
| 5,803,856 A * | 9/1998 | Iino et al. | 475/72 |
| 5,826,460 A | 10/1998 | Soncina et al. | |
| 5,887,674 A | 3/1999 | Gray, Jr. et al. | |
| 5,946,983 A * | 9/1999 | Brambilla | 74/730.1 |
| 6,170,587 B1 * | 1/2001 | Bullock | 180/69.6 |
| 6,202,016 B1 * | 3/2001 | Stephenson et al. | 701/51 |
| 6,272,950 B1 | 8/2001 | Braun et al. | |
| 6,361,463 B1 * | 3/2002 | Kojima | 475/79 |
| 6,393,944 B1 | 5/2002 | Soncina et al. | |
| 6,397,994 B1 | 6/2002 | Bowen | |
| 6,440,026 B1 * | 8/2002 | Johnson et al. | 475/81 |
| 6,481,314 B2 * | 11/2002 | Nemoto et al. | 74/733.1 |
| 6,508,742 B2 | 1/2003 | Popp et al. | |
| 6,602,161 B2 | 8/2003 | Hemmingsen et al. | |
| 6,637,294 B2 * | 10/2003 | Nemoto | 74/730.1 |
| 6,692,409 B2 | 2/2004 | Fukumoto et al. | |
| 6,712,166 B2 | 3/2004 | Rush et al. | |
| 6,719,080 B1 | 4/2004 | Gray, Jr. et al. | |
| 6,723,022 B2 | 4/2004 | Kim | |
| 6,877,580 B2 * | 4/2005 | Hasegawa et al. | 180/292 |
| 6,945,893 B2 | 9/2005 | Grillo et al. | |
| 7,074,149 B2 * | 7/2006 | Morimoto | 475/83 |
| 7,273,122 B2 * | 9/2007 | Rose | 180/165 |
| 2002/0092372 A1 | 7/2002 | Bowen | |
| 2003/0103850 A1 | 6/2003 | Szulczewski | |

FOREIGN PATENT DOCUMENTS

| | | |
|---|---|---|
| EP | 0599986 | 3/1993 |
| EP | 0839295 | 2/1997 |
| EP | 1111274 | 6/2001 |
| JP | 61189344 | 8/1986 |
| JP | 10184410 | 7/1998 |
| WO | 2005/118323 | 12/2005 |

OTHER PUBLICATIONS

Cumulo, "Brake Energy Drive", 2 pages.
Cumulo, "Hydrostatic Drive", 2 pages.
Hugosson, Conny., "Cumulo Hydrostatic Drive—a Vehicle Drive with Secondary Control", Volvo Flygmotor AB, Cumulo Division, S-461 81 Trollhattan, Sweden, 20 pages.
Cumulo, "Technical Description", (1) Cumulo Division, Volvo Flygmotor AB, S-461 81 Trollhattan Sweden, 8 pages.
Schärlund et al., "Field Tests with the Cumolo System", Abstract, Sep. 1990.

* cited by examiner

Clutch and Gear Train Sequence

C1 - Primary Pump/Motor (PPM)
C2 - Direct Drive Shaft Engagement
C3 - Hydro Low, Hydro High, and Neutral for Secondary Pump/Motor (S)

| Drive Mode | C1 PPM | C2 Direct Drive | C3 Hydro Low Z4 | C3 Neutral | C3 Hydro High Z7 |
|---|---|---|---|---|---|
| Neutral | O | O | | N | |
| Hydro Low | C | O | C | | |
| Hydro High | C | O | | | C |
| Direct | C | C | C | | |
| Braking/Charge | C | O | C | | |
| Engine Off/Low | C | O | | N | |
| Engine Off/High | C | O | | | C |

O=Open (Clutch Disengaged)
C=Closed (Clutch Engaged)
N=Neutral (Clutch Disengaged)

FIG. 7

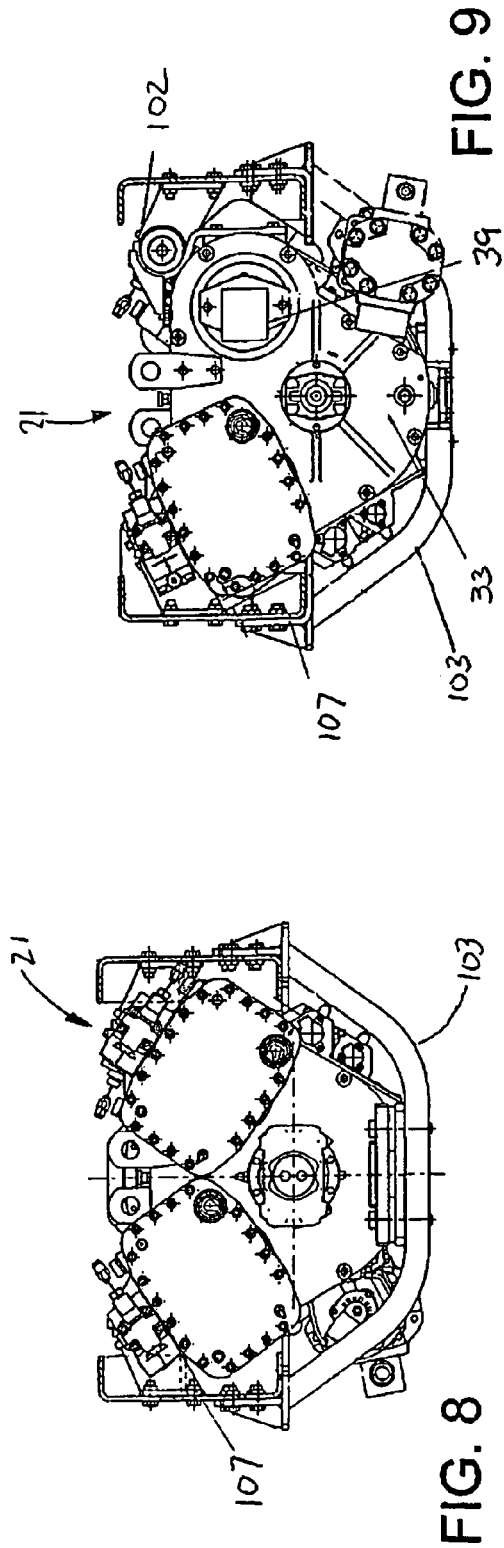
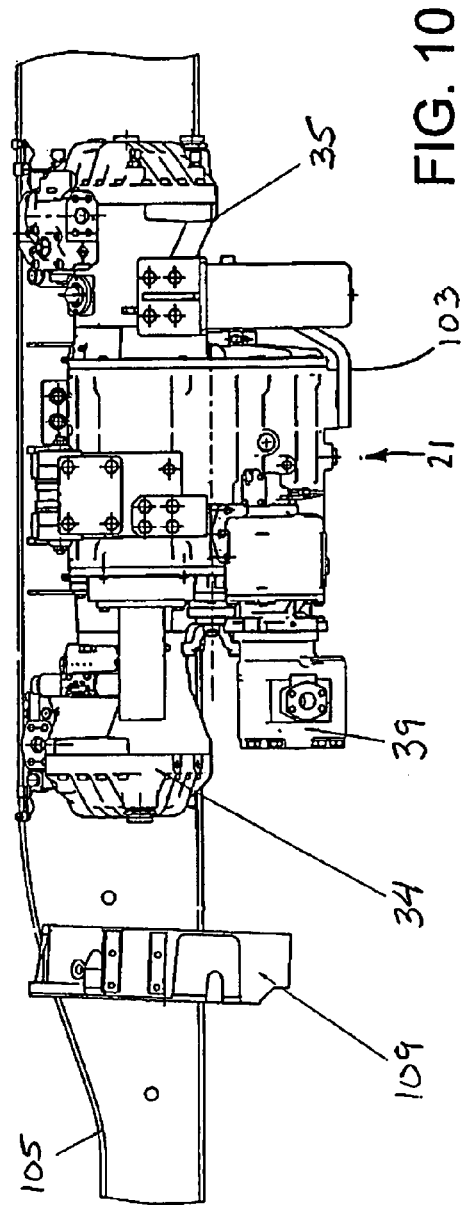
FIG. 8
FIG. 9
FIG. 10

GEAR BOX FOR HYDRAULIC ENERGY RECOVERY

RELATED APPLICATIONS

This application claims the benefit of U.S. Provisional Application No. 60/674,031 filed Apr. 22, 2005, U.S. Provisional Application No. 60/764,908 filed Feb. 3, 2006, and U.S. Provisional Application No. 60/775,105 filed Feb. 21, 2006, all of which are hereby incorporated by reference in their entireties.

FIELD OF THE INVENTION

This invention relates generally to a unitized vehicle drive system that provides both hydraulic energy storage and recovery along with a direct mechanical drive mode for maximum fuel consumption efficiency throughout the vehicle's duty cycle. The drive system can be used on a variety of vehicle types, including in particular garbage collection vehicles and other vehicles that make frequent starts and stops, and which at least part of the time need to travel at "on-highway" speeds.

BACKGROUND OF THE INVENTION

For many years there has been recognition that vehicles could be made more fuel-efficient if the energy normally lost in decelerating or braking the vehicle could be somehow collected, stored and reused to accelerate the vehicle. A relatively large number of prior patents and published patent applications exist which are directed to various aspects of this general approach. Some have proposed to collect and store the energy in hydraulic accumulators and then reuse the energy through fixed or variable displacement hydraulic transmissions. A variation of this concept utilized a flywheel as an energy storage device for collecting and storing vehicle deceleration energy, either alone or in combination with a hydraulic accumulator.

Many of the previously disclosed systems do not lend themselves to use in existing truck designs whereas others require specially fabricated hydrostatic drive components.

Some systems heretofore have used a transmission including a hydrostatic transmission portion and a mechanical transmission portion. A typical hydrostatic transmission comprises a variable-displacement pump hydraulically coupled to a motor (typically, of fixed displacement), and appropriate controls for varying the displacement of the pump. The "mechanical transmission" may comprise a two-speed, shiftable, gear-type transmission that allows the hydrostatic transmission to use smaller and less expensive components. A problem with some hydrostatic transmissions has been the need to stop the vehicle to shift between different gear ratios.

One solution to this problem is described in U.S. Pat. No. 6,202,016 which discloses a hydrostatic transmission that can be shifted "on the go". The transmission includes a mechanical transmission that is provided with a shift cylinder having a neutral position, a low gear position and a high gear position. The hydrostatic transmission is electronically controlled so that displacement of a variable displacement pump is coordinated with the shifting of the mechanical transmission to achieve the shift-on-the-go capability. The transmission disclosed in this patent, however, limits the ability to optimally control engine speed and pump displacement independently of existing driving conditions, nor does such transmission lend itself to efficient operation at "on highway" speeds, typically speeds greater than 40 mph.

SUMMARY OF THE INVENTION

The present invention not only provides both a hydraulic energy recovery and a mechanical drive system in one unit but also provides integral mounting of hydraulic pump/motors for primary drive, secondary drive, and pumps for cooling, lubrication, and low pressure systems along with a mounting position for a power take-off (PTO) device. A preferred embodiment is for use with an internal combustion (IC) engine, but could be powered by other forms of prime movers such as gas turbines, electric motors and fuel cells.

According to one aspect of the invention, a power transfer apparatus for a vehicle comprises a housing having an axis, a power input shaft at one axial end of the housing that is connectable to a prime mover of the vehicle for receiving power from the prime mover, an output drive shaft at an opposite axial end of the housing that is connectable to one or more wheels of the vehicle for transfer of power to the one or more wheels, a primary hydraulic pump mounted to a first axial end of the housing, a hydraulic motor mounted to an opposite second axial end of the housing, and a transmission assembly contained within the housing, which the transmission assembly includes a pump coupling for coupling the primary hydraulic pump to the power input shaft, and a motor coupling for coupling the hydraulic motor to the output drive shaft.

In a preferred embodiment, the primary hydraulic pump and motor have respective rotational drive shafts extending parallel to the power input and output drive shafts, and a plurality of hydraulic motors are mounted to the second axial end of the housing. Primary hydraulic pump power circuitry transfers hydraulic power from the primary hydraulic pump to an energy storage device, as does hydraulic motor power circuitry during use of the hydraulic motor as a pump to effect braking of the vehicle and energy regeneration.

According to another aspect of the invention, a power transfer apparatus for a vehicle comprises a power input shaft that is connectable to a prime mover of the vehicle for receiving power from the prime mover, an output drive shaft that is connectable to one or more wheels of the vehicle for transfer of power to the one or more wheels, a primary hydraulic pump, a variable displacement hydraulic motor, a transmission assembly including a pump coupling for coupling the primary hydraulic pump to the power input shaft and a motor coupling for coupling the hydraulic motor to the output drive shaft, and hydraulic power circuitry for directly or indirectly supplying hydraulic power from the hydraulic pump to the hydraulic motor. The transmission assembly includes a mechanical transmission connected between the hydraulic motor and the output drive shaft, and the mechanical transmission has first and second gear ratios and a clutch for shifting between the first and second gear ratios. The displacement of the hydraulic motor is controlled by a controller to synchronize the speed and/or torque output of the hydraulic motor to the rotational speed of the output drive shaft for shifting between the first and second gear ratios while the output drive shaft is rotating. Consequently, this enables the displacement of the primary hydraulic pump and/or speed of the prime mover to be optimized for any given driving condition.

In other words, the present invention enables shifting "on the go" to be controlled by a variable displacement drive motor or motors adjusted to ramp rotational speed through an acceptable speed range, and then to initiate the shift actuation signal at the proper time to meet synchronization during the ramp up or ramp down in speed. The pressure source can be supplied by an accumulator system with a variable volume pump at a fixed or zero stroke during the synchronization phase. Shifting can be effected even when only a fixed volume pump is used to supply pressurized fluid to maintain a charge in the accumulator system. The shifting process may also be applied not only for increasing and decreasing gear ranges but also changing between mechanical and hydraulic drives.

The pump and accumulator try to maintain a pressure defined by the operating conditions of the vehicle or machine being driven. The hydraulic motors are hydraulic machines that either convert hydraulic pressure into rotational mechanical energy or convert rotational mechanical energy into hydraulic pressure. The process works whether the change in ratio is increasing or decreasing, or the machine changes from hydraulic drive to or from mechanical drive.

According to a further aspect of the invention, provision is made for continued hydraulic braking even when the energy storage device cannot accept any more energy. This is accomplished by directing flow from one or more hydraulic motors that are being reversely driven as pumps to through a pressure relief valve so that the hydraulic system will continue to absorb energy and thereby continue to effect vehicle braking of the vehicle when braking is still be commanded.

According to still another aspect of the invention, an apparatus forming a portion of a vehicle drive system, comprises a hydraulic motor; and a gear assembly, the gear assembly, in a first mode, enabling the motor to drive wheels of the vehicle and, in a second mode, providing a direct mechanical connection to the wheels of the vehicle with an engine of the vehicle for enabling the engine to drive the wheels.

As will be appreciated by those skilled in the art, one or more of the principles of the present invention can be applied to any hydraulic drive system employing one or more variable displacement drive motors with or without the feature of hydraulic energy recovery.

Further features of the invention will become apparent from the following detailed description when considered in conjunction with the drawings.

BRIEF DESCRIPTION OF THE DRAWINGS

FIG. 7 is a chart showing a clutch and gear train sequence for the power drive unit.

FIG. 8 is a rear end view of an exemplary power drive unit.

FIG. 9 is a front end view of the power drive unit of FIG. 8.

FIG. 10 is a side elevational view of the power drive unit.

DETAILED DESCRIPTION

Figure 1:
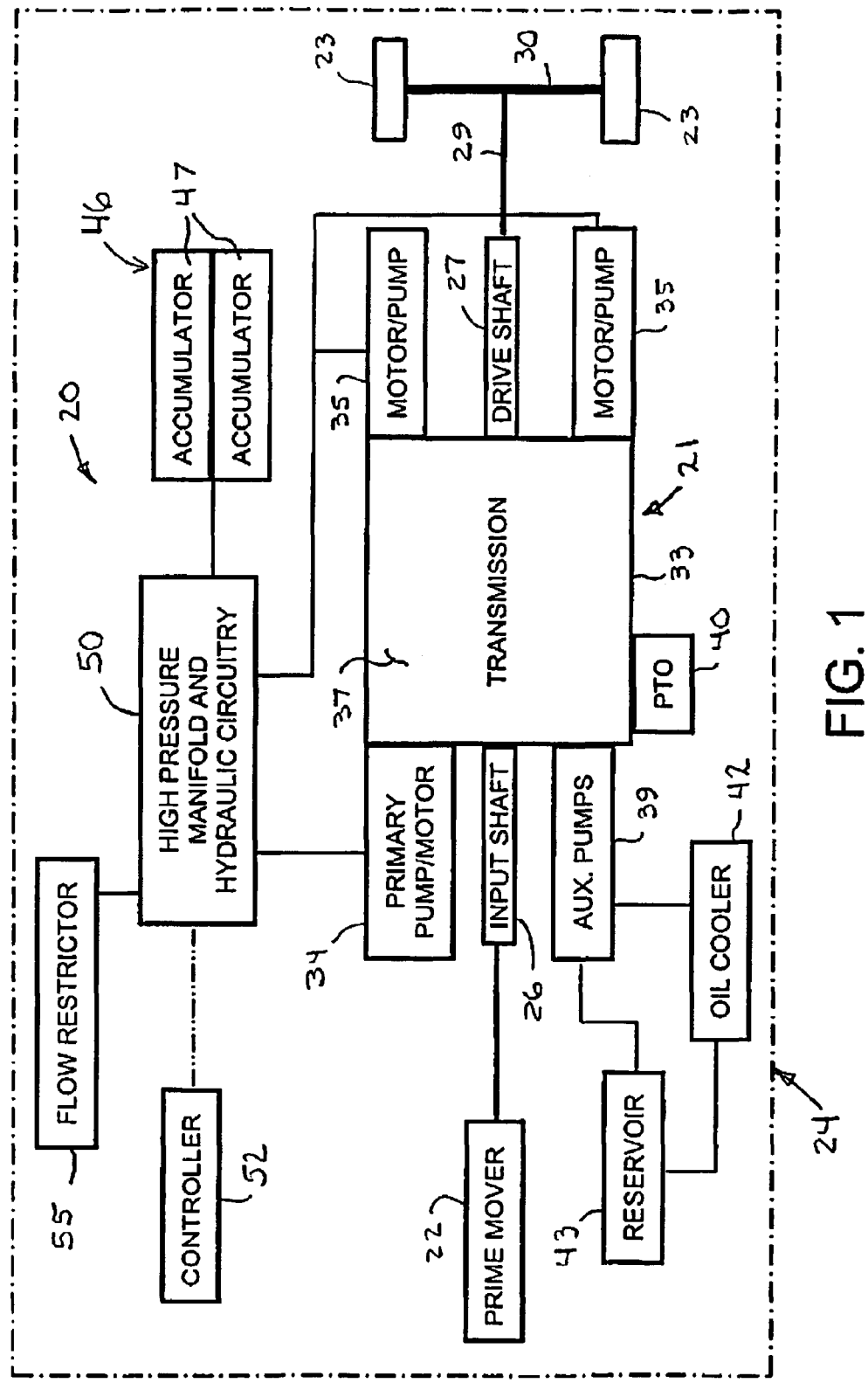
FIG. 1 is a diagrammatic illustration of an exemplary vehicle drive system including a power drive unit according to the Invention.

Referring now in detail to the drawings and initially to FIG. 1, an exemplary vehicle drive system according to the present invention is indicated generally by reference numeral 20. The vehicle drive system 20 includes a power drive unit 21 connected between a prime mover 22 and the drive wheel or wheels 23 of a vehicle generally denoted by reference numeral 24. The prime mover preferably is an internal combustion (IC) engine, but other prime movers could also be used, such as gas turbines, electric motors and fuel cells. The power drive unit includes a power input shaft 26 to which the engine is drivingly connected by any suitable means and an output drive shaft 27 drivingly connected to one or more the wheels 23 of the vehicle by any suitable means, such as by a drive shaft 29 and transaxle 30.

The power drive unit 21 is characterized by a housing 33 that provides a mount for one or more primary hydraulic pumps 34 and one or more hydraulic drive motors 35 (two being shown). The embodiment shown in FIG. 1 utilizes one reversible pump/motor unit 34 and two reversible motor/pump units 35 to drive the vehicle in a city or working mode. This arrangement optimizes the packaging of these units into the unitized transmission by using lower cost standard hydraulic units. It also permits more economical gearing from the dual power paths (lower tooth loading), more responsive shift times (less mechanical inertia), a smaller overall package size and weight, and generally smoother operation.

Each pump 34 and motor 35 preferably is of a variable displacement type, and each preferably can be reversely driven to function as a motor or pump, respectively. By way of example, the pumps and motors may be axial piston pumps and motors, wherein displacement of the pump/motor is varied by changing the tilt angle of a tiltable swash plate, in a manner that is well known to those skilled in the art.

The housing contains a transmission assembly 37 to which the power input shaft 26 and output drive shaft 27 are connected. The housing further provides a mount for one or more auxiliary pumps 39 for cooling, lubrication, and/or low pressure systems along with a mounting position for a power take-off (PTO) device 40 that may be used to provide hydraulic power to other parts of the vehicle via a hydraulic system separate from the hydraulic system of the power drive unit (except that power for the PTO device is taken off the power drive unit. The auxiliary pumps may be a stacked arrangement of pumps, particularly positive displacement pumps, driven by a common drive shaft. As depicted in FIG. 1, one auxiliary pump may circulate hydraulic fluid through a cooler 42 and back to a reservoir 43. Another auxiliary pump may be used to supply pressurized fluid to the transmission assembly 37 and/or other drive components for lubrication, and another auxiliary pump may be used to supply low pressure fluid to components of the hereinafter described hydraulic circuits to operate, for example, pilot valves used to control fluid pressure components.

As illustrated in FIG. 1, the primary pump 34 is mounted to one axial end of the housing while the hydraulic motors 35 are mounted to the opposite axial end of the housing. In addition, the auxiliary pumps 39 are mounted to the same axial side of the housing as the primary pump 34. It is noted that in accordance with one or more aspects of the invention, the motors and/or pumps may be otherwise mounted. For example, the primary pump could be separately mounted, such as to the engine.

The vehicle drive system 20 further comprises an energy storage device 46. In the illustrated embodiment the energy storage device is an accumulator system including one or more pressurized fluid accumulators 47, specifically hydropneumatic accumulators. Other energy storage devices may be used such as a mechanical fly wheel or batteries. The accumulators 47 are supplied with pressurized fluid from the primary pump 34 and/or motors 35 by means of a high pressure manifold and fluid circuitry generally indicated at 50. The fluid circuitry 50 is commanded by a system controller 52, more particularly an electronic system controller, to control the flow of pressurized fluid to and from the accumulators 47, the pump 34, motors 35 and other hydraulic components, including a flow restrictor 55, the function of which is discussed below. The system controller may include one or more microprocessors and associated components programmed to carry out the herein described operations. The controller may have various inputs for receiving data from various sensors that monitor various operational parameters of the vehicle and various outputs by which the controller commands various operations.

Figure 2:
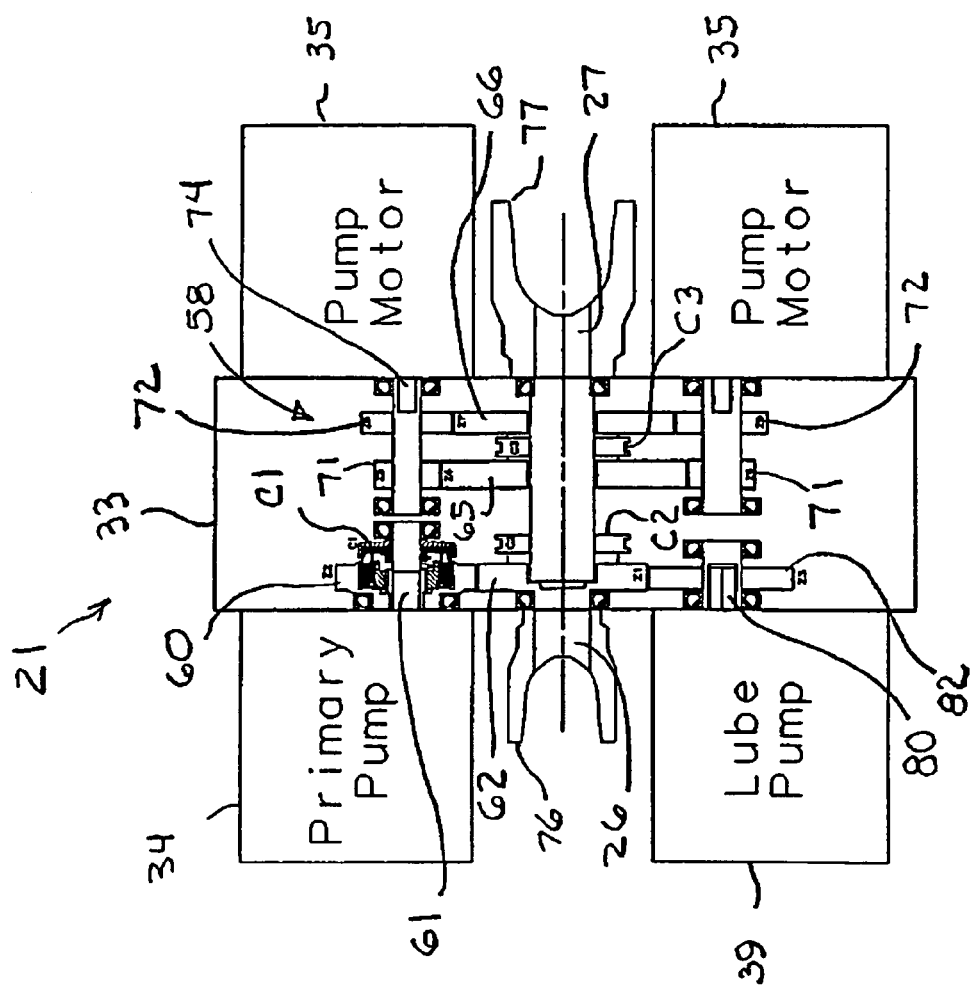
FIG. 2 is a diagrammatic illustration of the power drive unit of FIG. 1, showing the unit in a neutral state.

Referring now to FIG. 2, the transmission assembly 37 can be seen to include a primary pump clutch C1 for selectively drivingly coupling the primary pump to the power input shaft 26, a direct drive shaft engagement clutch C2 for selectively drivingly coupling the output drive shaft 27 to the power input shaft 26, and a gear selector switch C3 for switching a mechanical transmission 58 between neutral, hydro low and hydro high states.

The clutch C1 may be of any suitable type, although a wet multi-plate slip clutch is preferred to allow the clutch to be engaged without having to synchronize the speed of the primary pump to the speed of the power input shaft. As shown, the clutch can be engaged to couple a gear 60 that is rotatably coupled to the drive shaft 61 of the primary pump 34 to a gear 62 that is rotatably coupled to the power input shaft 26. Engagement and disengagement of the clutch C1 may be effected by a fluid pressure actuator (not shown) controlled by the electronic system controller 52 (FIG. 1).

The clutch C2 may be of any suitable type, such as a jaw or square tooth clutch that provides for transfer of high torques without slippage. One jaw of the clutch may be fixedly rotatably coupled to the power input shaft 26 (or more particularly to the gear 62) and the other movable jaw may be keyed to the output drive shaft 27 and shifted axially by a direct drive shift cylinder (not shown in FIG. 2) to engage and disengage the jaws. The direct drive shift cylinder may be controlled in a conventional manner by the electronic system controller 52 (FIG. 1).

The clutch C3 may be of any suitable type, such as a three position jaw or square tooth clutch that provides for transfer of high torques without slippage. The clutch includes jaws respectively fixed to gears 65 and 66 and a movable jaw keyed to the output drive shaft 27 and shifted axially by a gear shift cylinder (not shown in FIG. 2) between a neutral position disengaged from the gears 65 and 66 as depicted in FIG. 2, a hydro low (low gear) position depicted in FIG. 5, and a hydro high (high gear) position depicted in FIG. 6. The gears 65 and 66 are meshed with respective gears 71 and 72 on a gear shaft that is rotatably coupled to the drive shaft 74 of each hydraulic motor 35. The gear tooth ratios may be selected to provide desired hydro low and hydro high speed ratios between the motor drive shafts and the output drive shaft. The gear shift cylinder may be controlled in a conventional manner by the electronic system controller 52 (FIG. 1).

As seen in FIG. 2, the power input shaft 26 may be provided with a yoke 76 for connection to the prime mover 22 (FIG. 1). Similarly, the output drive shaft 27 may be provided with a yoke 77 for connection to the vehicle drive shaft 29 (FIG. 1).

It can also be seen in FIG. 2 that the several drive shafts of the pumps, motors and transmission assembly are all parallel with one another and with the power input and output drive shafts. In addition, the drive output shaft 27 may be coaxial with the power input shaft 26. Likewise, the drive shaft 61 of the primary pump 34 may be coaxial with the drive shaft 74 of one of the hydraulic motors 35 and the drive shaft 80 of the auxiliary pumps 39 may be coaxial with the drive shaft of the other hydraulic motor. The illustrated arrangement of the pumps, motors and drive shafts in association with the housing 33 provide a compact, unitized power drive unit. The drive shaft 80 has rotatably coupled thereto a gear 82 in mesh with the gear 62 whereby the auxiliary pumps are driven by the power input shaft.

In normal operation, the vehicle will be at a stopped condition with the transmission in neutral as shown in FIG. 2, where the clutches C1, C2 and C3 are all disengaged. With the clutches C2 and C3 disengaged, the transmission assembly will be in neutral, with no power being supplied to the drive wheels nor any braking function being effected by the drive motors.

The controller 52 may engage the clutch C1 while the engine is running to drive the primary pump 34. The high pressure manifold and fluid circuitry 50 includes valves (which may be integral in the housing) for directing pressurized hydraulic fluid from the primary pump to the accumulator system 46 to build up a controlled volume of hydraulic fluid under pressure. The accumulator system 46, as above indicated, may consist of a single accumulator or a bank of two or more units depending on the total volume of hydraulic fluid needed to store in the system for a given application. The flow from the primary pump is also available to supply the drive motors 35 for use in driving the vehicle. The primary pump may be commanded to supply pressurized fluid to the high pressure manifold and fluid circuitry as a function of the flow of pressurized fluid to or from the drive motors 35 and the energy stored in the accumulator system 46.

If the pressure level or other sensor input indicates that the accumulator system 46 is fully charged, then the electronic system controller 52 can disengage clutch C1 to the primary pump 34 and/or shut off the engine 22, conserving fuel until additional power is needed.

The clutches C2 and C3 may be operated by the controller 52 to provide two modes of vehicle operation, a first mode, also herein referred to as the city mode or work cycle mode, and a second mode, also herein referred to as the highway mode. In the first mode, the clutch C2 is disengaged and the clutch C3 is operated by the controller 52 to shift between neutral and one or more gear speeds between the drive motors 35 and the output drive shaft 27. In the city mode or work cycle mode, the power drive unit 21 is configured to efficiently and effectively accommodate frequent stop and go operation at low speeds, for example less than 40 mph, as the drive motors 35 drive the vehicle through the multiple speed mechanical transmission 58 (although it should be mentioned that a single speed transmission could also be employed or a transmission having three, four or more speeds, i.e. gear ratios).

In the first mode of operation, the position of the vehicle's accelerator and brake pedals may be detected by sensors and act as input commands to the electronic system controller 52. If the desired action is to accelerate, say from a stop position, then the electronic system controller 52 will shift clutch C3 to engage the gear 65 to shift the mechanical transmission into its hydro low position illustrated in FIG. 5 to start the vehicle in motion. The output drive shaft and the drive motors initially will not be rotating so the clutch can engage gear 65 connecting it to the output drive shaft 27. The controller may then command the high pressure manifold and hydraulic circuitry 50 to supply high pressure fluid from the accumulator system 46 and/or the primary pump 34 (if then operating) to the hydraulic drive motors 35 to drive the output drive shaft 27 through the mechanical transmission 58. This in turn will drive the drive wheels 23 of the vehicle to accelerate the vehicle from the stopped position. The displacement of the drive motors may be varied by the controller 52 to control the rate of acceleration to increase or maintain a constant speed (zero acceleration). Each drive motor may have the swash plate thereof set to maximum displacement. This will drive gear 65 through gear 71 to start the vehicle into motion. By reducing the swash plate angle the drive motors will rotate faster for a fixed volume of oil delivered to the drive motors, thereby accelerating the vehicle to a higher speed. The drive motors can operate to deliver high torque to the drive wheels of the vehicle.

If the vehicle is already moving and a desired action is to decelerate or brake the vehicle, the electronic system controller 52 directs the high pressure manifold and fluid circuitry 50 to receive high pressure fluid from the drive motors 35 which then will be reversely driven and act as pumps, thereby delivering high pressure fluid back to the accumulator system 46. The hydraulic drive motors, acting as pumps, will generate resistance in the drive train to slow the vehicle down. This action also recovers most of the kinetic energy from the vehicle and stores it in the accumulator system for future use by the drive system or for performing other hydraulically powered work related tasks on the vehicle.

The vehicle may be provided with mechanical brakes that normally will not be needed to decelerate the vehicle, but which will be available for use if the braking force required (such as a panic stop) is greater than that which is being generated by the reversely driven hydraulic motors acting as pumps, or as a back-up in case of a failure in the hydraulic drive system.

The stored energy in the accumulator system 46 can be used for propelling the vehicle in the city or working mode with the engine off until the accumulator system signals the electronic system controller 52 that it is getting low on fluid and needs to be refilled. At this point, the electronic system controller 52 may operate the primary pump as a motor. That is, the electronic system controller may direct the high pressure manifold and fluid circuitry 50 to supply high pressure fluid from the accumulator system 46 to the primary pump (then acting as a motor) with the clutch C1 engaged, to turn the engine 22 and thereby restart the engine. Once the engine is started, the primary pump 34 is again reversed to act as a pump and deliver high pressure fluid back through the high pressure manifold and fluid circuitry to the accumulator system for replenishment. This sequence can repeat continuously during city or working mode resulting in significant savings in fuel consumption. Moreover, the engine speed and displacement of the primary pump may be optimized to maintain the accumulator system at a desired level while pressurized fluid is intermittently withdrawn from the accumulator system as needed to drive the hydraulic motors for driving the drive wheel or wheels of the vehicle. That is, the engine can be operated in a desired range that minimizes pollutants while maximizing fuel economy. Generally it is desirable to run the engine as slow as possible, or not at all, even while the power requirements of the vehicle can vary significantly.

In the illustrated embodiment, the city or work mode uses the two speed mechanical transmission 58 to cover respective speed ranges so that the hydraulic drive motors 35 can be operated within their most efficient speed ranges. For example, the hydro low gear ratio can be used to cover vehicle speeds from 0 to about 25 mph and the hydro high gear ratio can be used to cover vehicle speeds from about 25 to about 40 mph. The selection of the shifting point is set by the electronic system controller 52 software or can be manually selected by the vehicle operator depending upon desired duty cycle and operating conditions. The shift points do not have to be speed related but can be modified or controlled by other sensor inputs such as vehicle incline angle, gross loaded weight, ambient temperature, hydraulic fluid temperature, or other performance influencing factors.

Once the vehicle has accelerated to or past the upper end of the hydro low range, such as about 25 mph, the electronic system controller 52 commands the transmission assembly 37 to shift to the hydro high gear ratio. Since both gear sets of the hydraulic drive motors are in constant mesh and shifting is accomplished by the clutch C3 capable of selecting "neutral" for idle and direct drive, hydro low or hydro high, it is possible to control the speed of the drive motors for synchronization to achieve a smooth shift either up or down. This can be accomplished by using the stored hydraulic fluid from the accumulator system 46 independent of the speed or displacement of the primary pump 34. More particularly, the displacement of the hydraulic drive motors 35 may be controlled by the electronic system controller 52 to synchronize the speed and/or torque output of the hydraulic drive motors to the rotational speed of the output drive shaft 27 for shifting between the first and second gear ratios while the output drive shaft is rotating. Consequently, shifting is effected without having to vary the displacement of the primary pump 34, as is desired.

More particularly, shifting from the hydro low gear ratio to the hydro high gear ratio can be initiated by varying the displacement of the drive motors (by varying the tilt angle of a swash plate) such that no or a minimal amount of torque is being transferred between the drive motors and the drive shaft 27. This allows the clutch C3 to be easily shifted into neutral. Alternatively, the controller could command the high pressure manifold and fluid circuitry to reduce pressure or flow from the accumulator system to the drive motors and achieve the same reduction in torque to allow the shift of clutch C3 into neutral.

Figure 5:
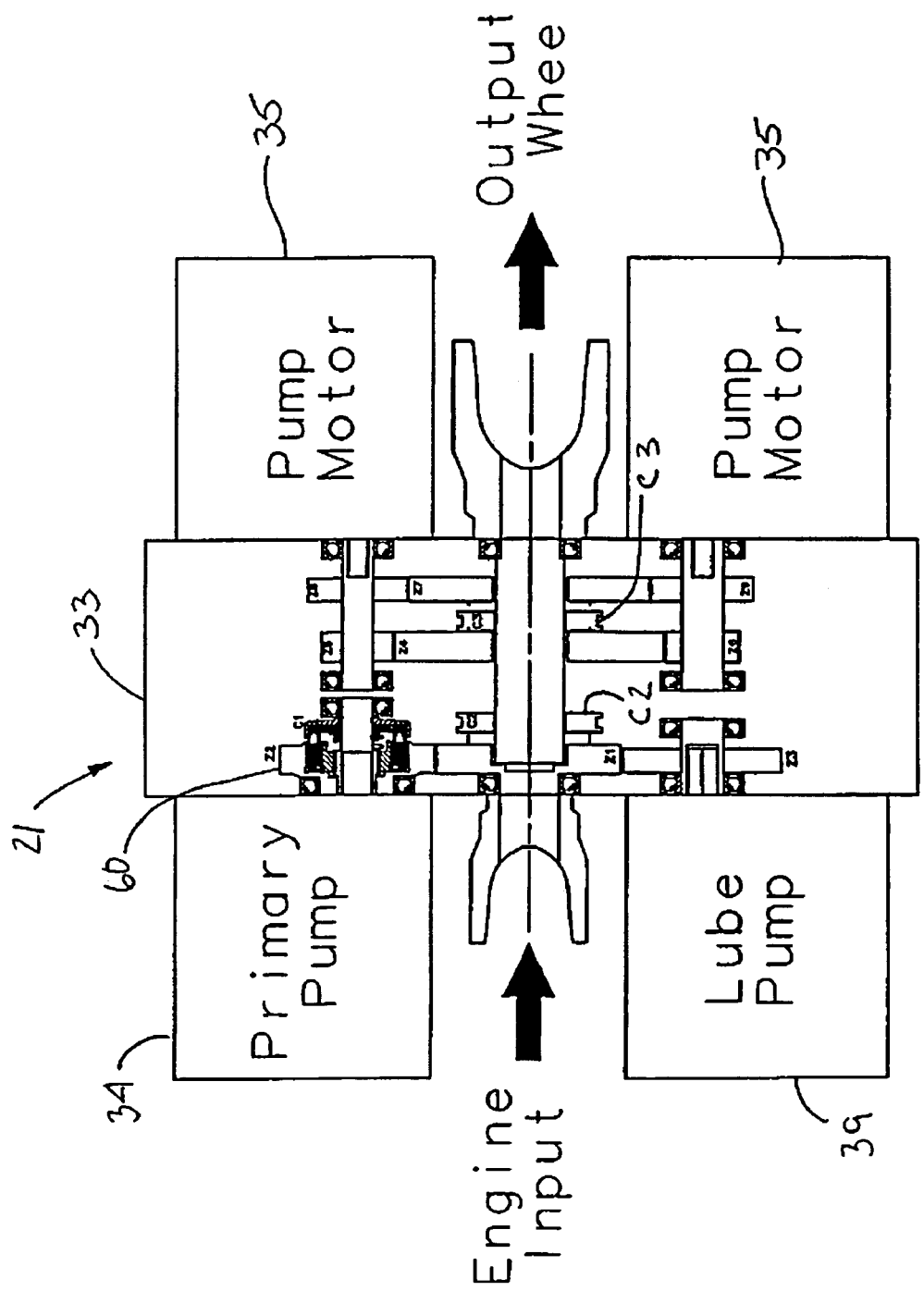
FIG. 5 is a diagrammatic illustration of the power drive unit of FIG. 1, showing the unit in a hydrostatic drive mode in low gear.
Figure 6:
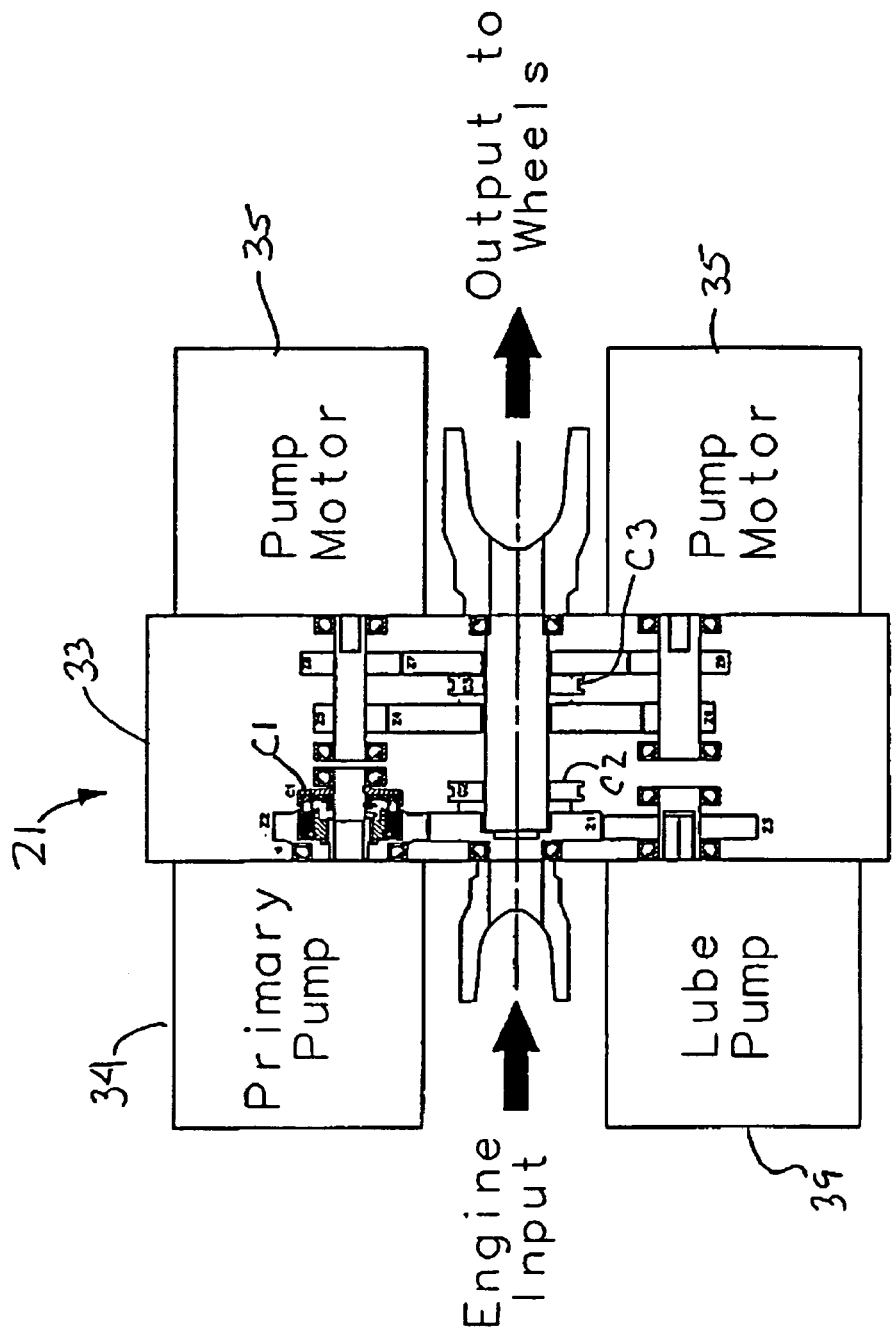
FIG. 6 is a diagrammatic illustration of the power drive unit of FIG. 1, showing the unit in the hydrostatic drive mode in high gear.

After the clutch C3 is shifted into neutral, the displacement of the drive motors and/or the flow of fluid from the accumulator system can be changed to synchronize the speed of the gear 66 to be newly engaged by the clutch C3 to the speed of the output drive shaft 27. Due to the gearing ratio between gear sets 65/71 and 66/72, gear 66 will initially be rotating at a higher speed than the output drive shaft and a smooth engagement between gear 66 and the output drive shaft normally cannot be made. As the rotating speed of the drive motors continues to ramp down, the rotating speed of gear 66 will pass through that of the output drive shaft. The controller will command the clutch C3 actuator to move towards the hydro high position and synchronously engage gear 66 with the output drive shaft as depicted in FIG. 5, whereupon the mechanical transmission will be in hydro high. When in hydro high, the displacement of the drive motors and/or the flow of fluid from the high pressure manifold to the drive motors may be controlled to control the acceleration (or deceleration) of the vehicle within the hydro high range, such as from 25 to 40 mph.

For those skilled in the art, the shifting from hydro high back to hydro low can be accomplished by basically reversing the previous sequence.

Figure 3:
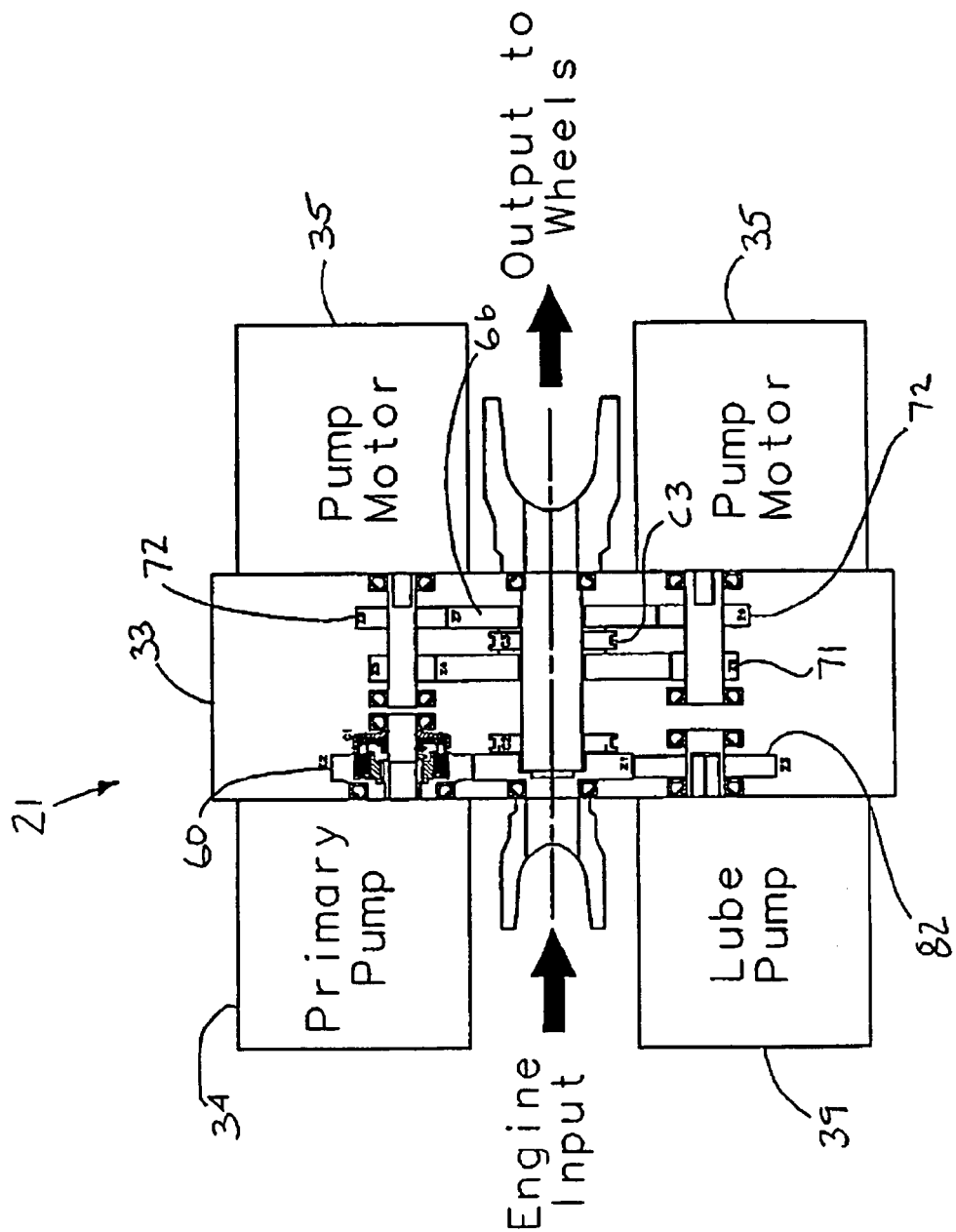
FIG. 3 is a diagrammatic illustration of the power drive unit of FIG. 1, showing the unit in a direct drive mode.

If the vehicle operator commands the vehicle to be accelerated to or past the top speed of the city or working mode setting, such as about 40 mph, the electronic system controller 52 commands the transmission assembly 37 to shift into the second or highway mode. To this end, the clutch C2 is engaged as depicted in FIG. 3, whereupon the engine 22 will directly drive (rather than hydrostatically drive) the driven wheel or wheels of the vehicle. In a manner similar to that described above, shifting from the hydrostatic drive to direct drive can be initiated by varying the displacement of the drive motors (by varying the tilt angle of a swash plate) such that no or a minimal amount of torque is being transferred between the drive motors and the drive shaft 27. This allows the clutch C3 to be easily shifted into neutral. Alternatively, the controller could command the high pressure manifold and fluid circuitry to reduce pressure or flow from the accumulator system to the drive motors and achieve the same reduction in torque to allow the shift of clutch C3 into neutral. In addition, the speed of the engine can be controlled by the controller to substantially match the speed of the power input shaft to the output drive shaft to enable easy engagement of clutch C2.

Figure 4:
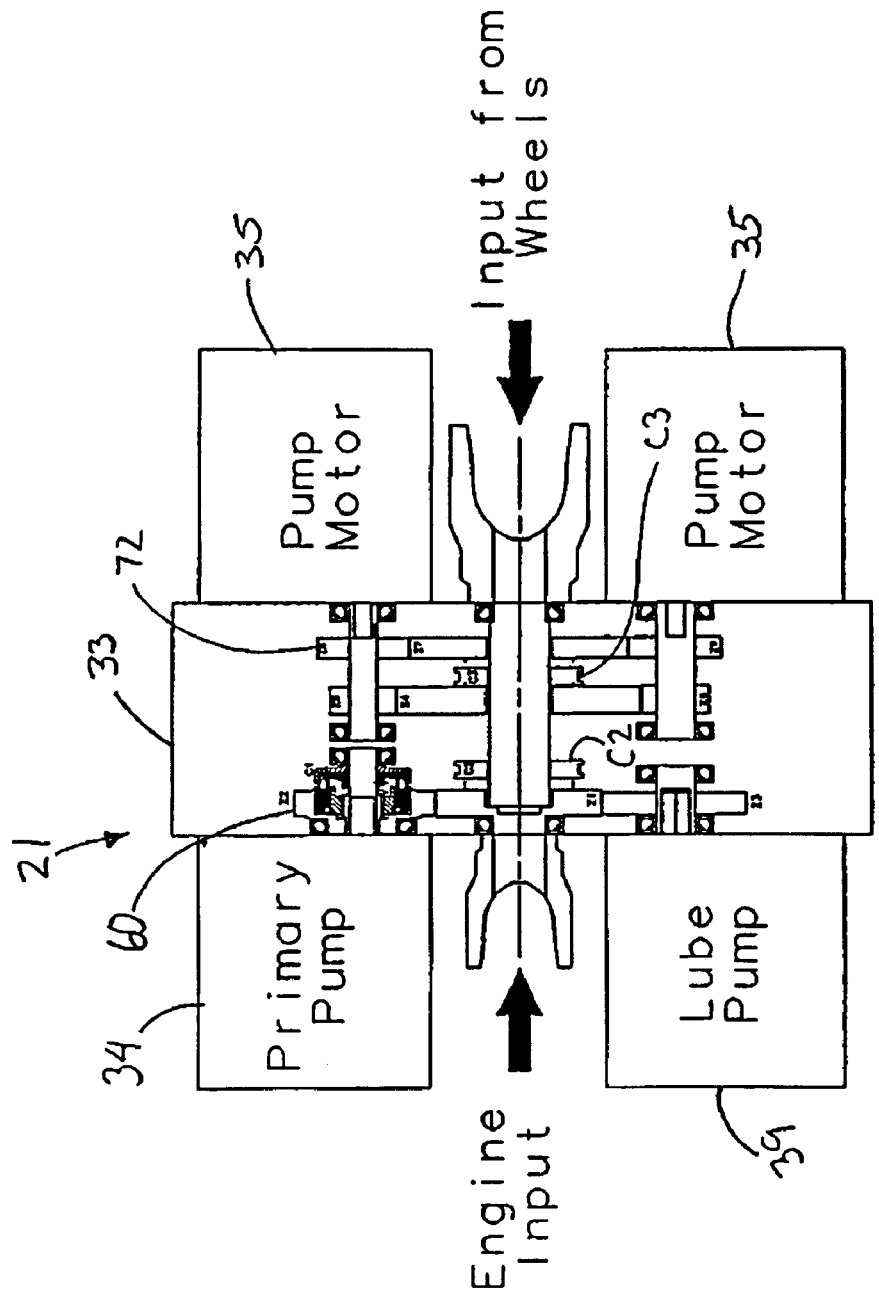
FIG. 4 is a diagrammatic illustration of the power drive unit of FIG. 1, showing the unit in a braking/accumulator charging state.

In this mode, the engine will be running within it's most efficient speed range and best fuel economy for highway speeds. The drive motors preferably will be disengaged from the drive train by clutch C3 set in neutral to further maximize overall vehicle efficiency. However, when braking is called for, the clutch C3 may be engaged (with or without disengagement of the clutch C2) whereupon the hydraulic motors, acting as pumps, generate resistance in the drive train to slow the vehicle down and recover kinetic energy from the vehicle for storage in the accumulators. If the vehicle is being slowed to a stop, the clutch C2 may need to be disengaged unless it is desired to shut off the engine. In FIG. 4, a braking/energy regeneration state of the transmission assembly 37 is depicted, the clutch C3 being engaged and the clutch C2 being open. Shifting from direct drive back into to hydro high can be effected by reversing the sequence described above to achieve a smooth synchronous shift.

The above described exemplary sequencing of the clutches and corresponding states of the power drive unit 21 is set forth in the chart shown in FIG. 7.

An advantage afforded by the herein described energy recovery system is in the conservation of the vehicle's mechanical brakes. During normal operation, kinetic energy from the deceleration or braking mode is fed back into the accumulator system through the high pressure manifold by the reversely driven drive motors acting as pumps. When the accumulator system is completely full, then excess fluid at high pressure may be directed through a pressure relief valve so that the hydraulic system will continue to absorb kinetic energy, as opposed to simply dumping flow to the reservoir. This reduces the vehicle's use of mechanical brakes and minimizes wear on the brake pads. It also decreases the need to use engine braking, often referred to as "jake braking" and their attendant noise polluting loud discharge of air.

The unitized construction of the transmission assembly also allows many if not most of the fluid circuits to be provided internally in the housing and this minimizes the number and lengths of exposed hydraulic piping and hose connections. This results in a lower weight and more easily mounted units for installation in a variety of vehicles.

Figure 11:
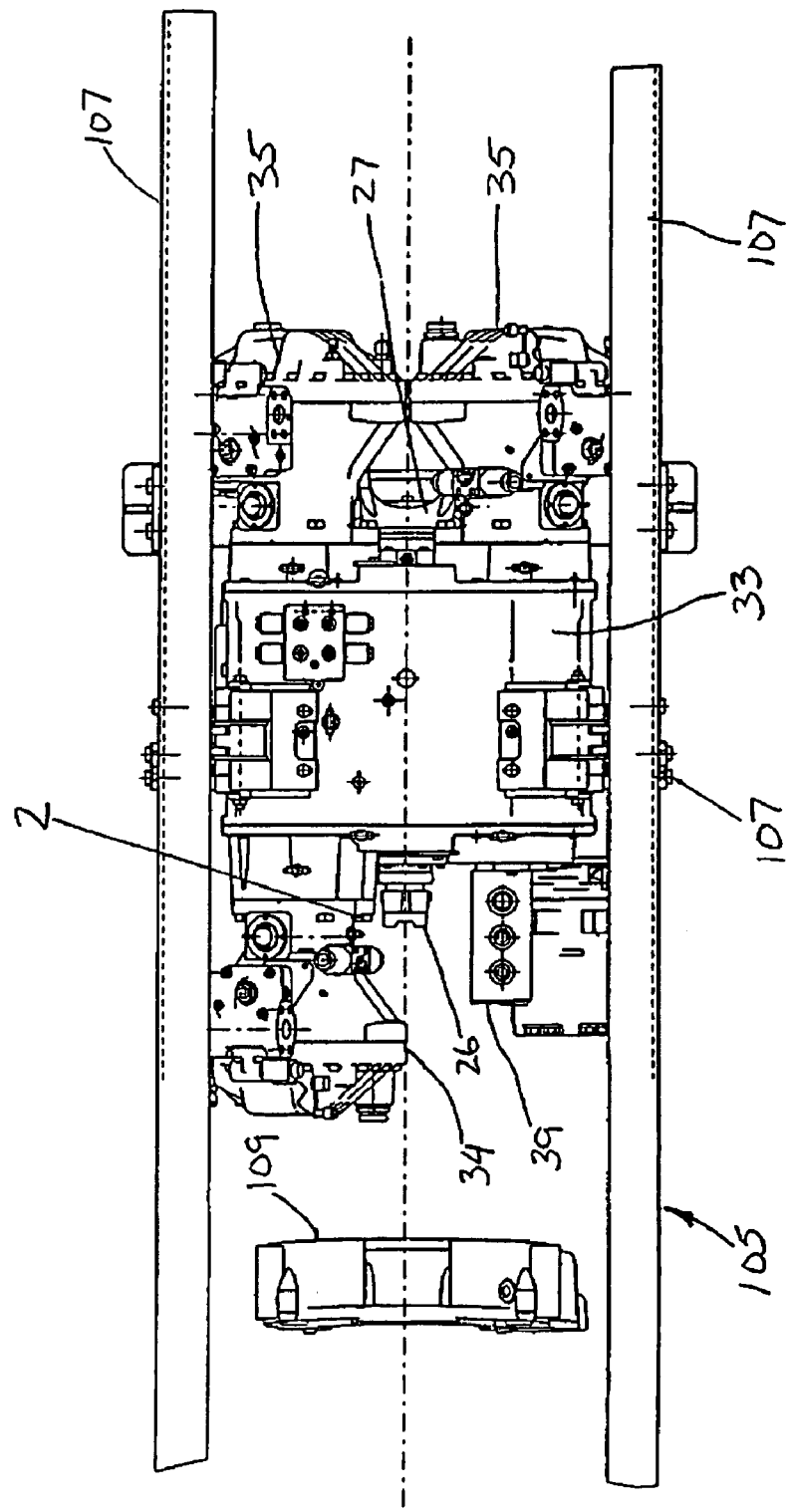
FIG. 11 is a top view of the power drive unit, shown installed in the frame of a vehicle.

An exemplary implementation of the above-described features of the invention is shown in FIGS. 8-18, wherein the same numbers are used to denote the above described corresponding components. Briefly, FIGS. 8-11 show the assembled power drive unit 21 including the housing 33 to which the primary pump 34, auxiliary pump 39, and drive pumps 35 are mounted. The power take-off device 40 also can be seen to be mounted to the housing 33. The housing 33 may be provided with upper mounts 102 and a back support assembly 103 for mounting the power drive unit to the frame 105 of the vehicle 24. In FIG. 11, the power drive unit 21 is shown installed to parallel rails 107 of the vehicle frame 105 in approximately the same position that would have been occupied by a conventional vehicle transmission. The flywheel housing 109 of the engine is also shown.

Figure 13:
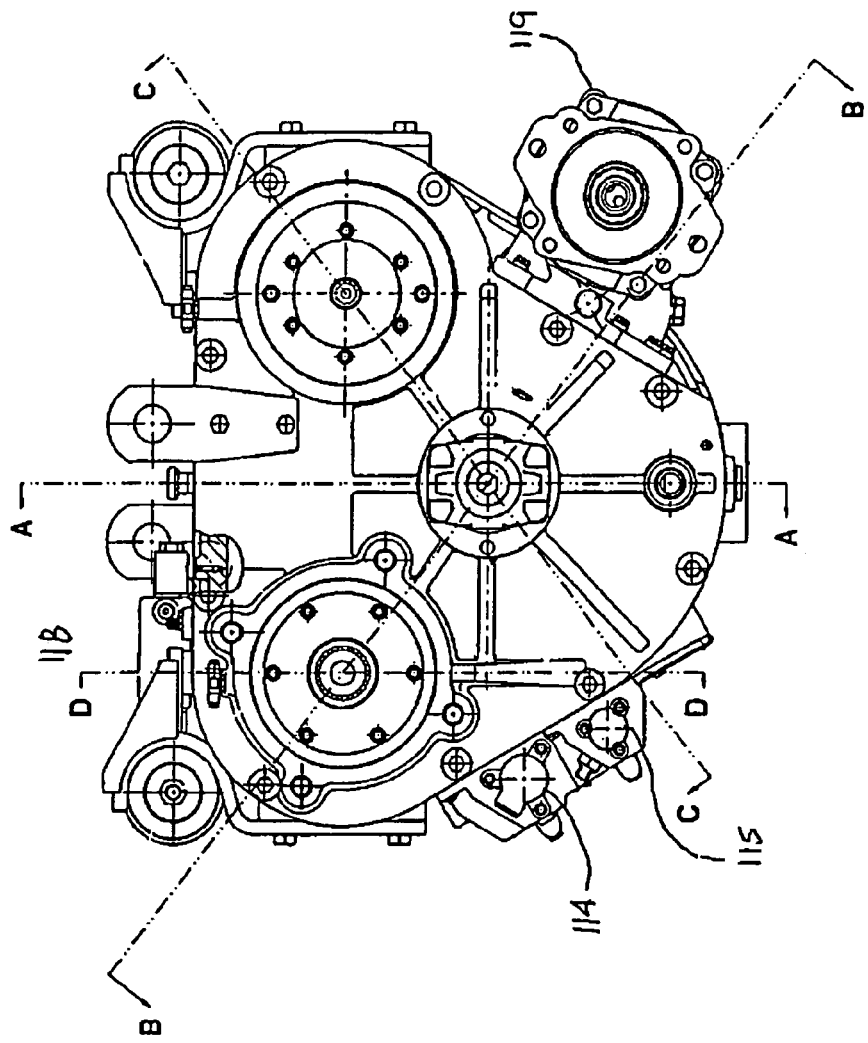
FIG. 13 is an end elevational view of the transmission assembly.
Figure 12:
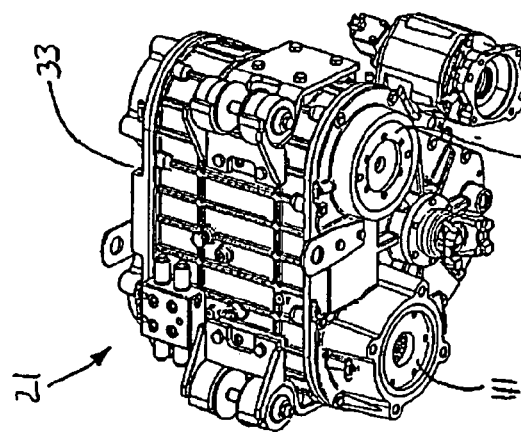
FIG. 12 is a perspective view of the power drive unit with the hydraulic pumps and motors removed to show the transmission assembly.
Figure 14:
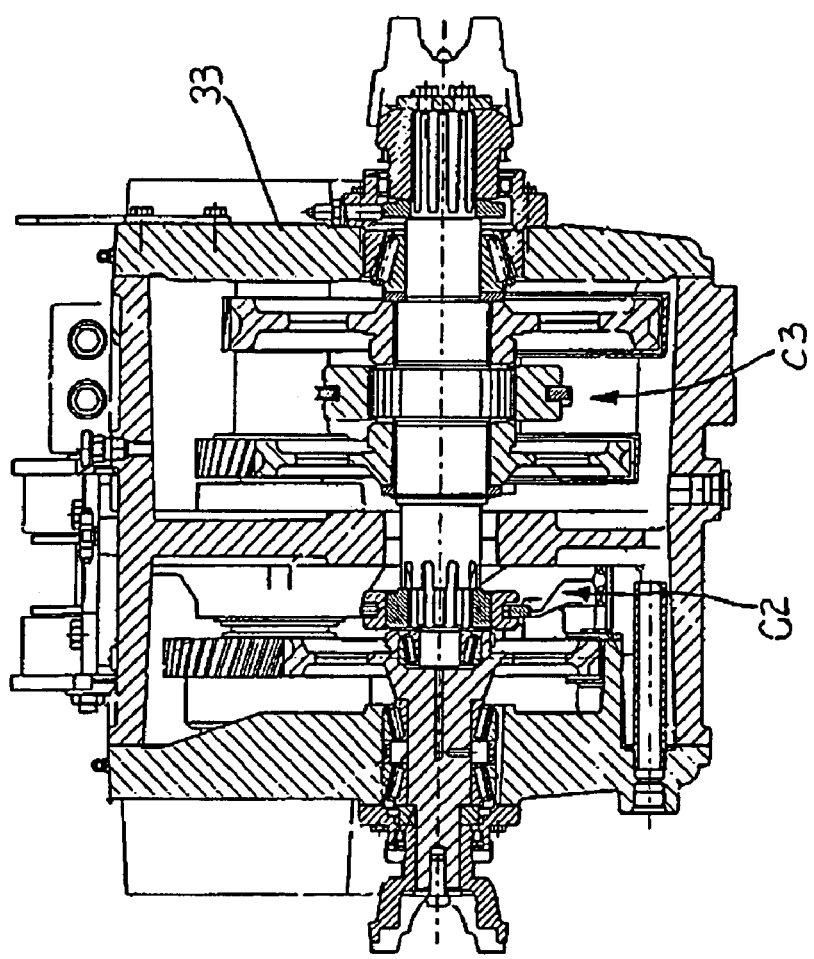
FIG. 14 is a cross-sectional view through the transmission assembly, taken along the line A-A of FIG. 13.
Figure 15:
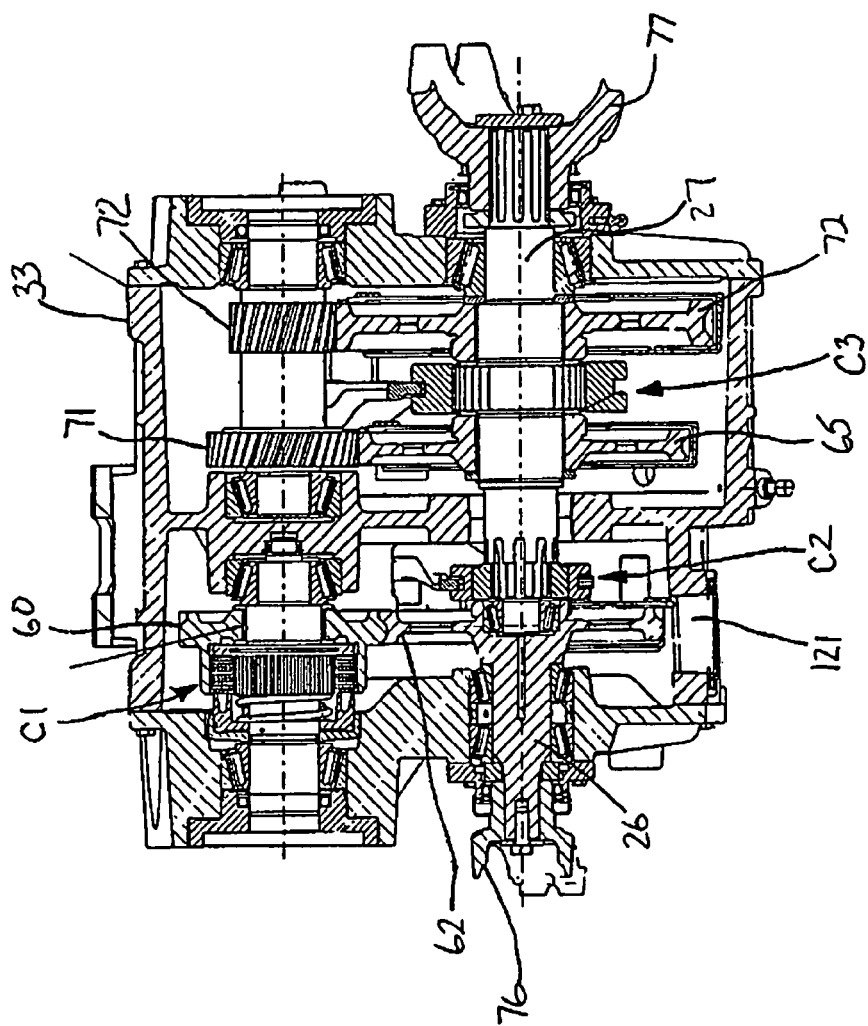
FIG. 15 is a cross-sectional view through the transmission assembly, taken along the line B-B of FIG. 13.
Figure 16:
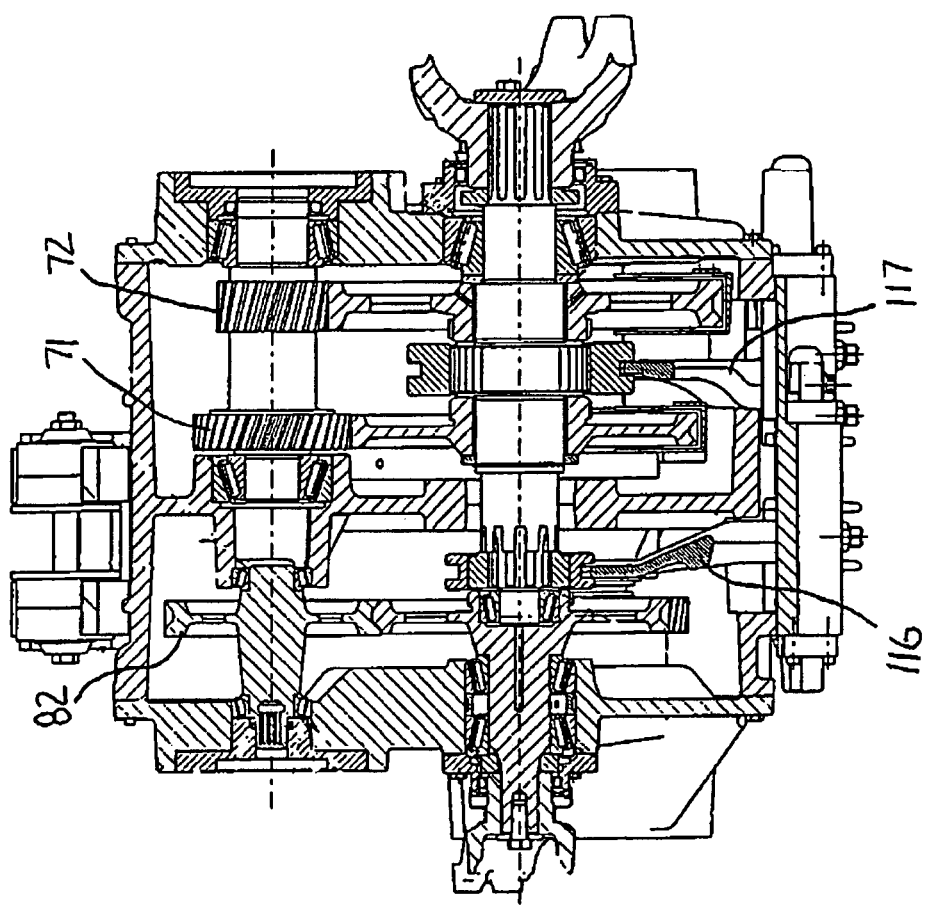
FIG. 16 is a cross-sectional view through the transmission assembly, taken along the line C-C of FIG. 13.

In FIGS. 12 and 13 the power drive unit 21 is shown with the pumps and motors removed. This reveals the mounting surfaces 111 and 112 for the primary and auxiliary pumps 34 and 39, and the housing will have similar mounting surfaces for the drive motors 35 on the opposite axial end of the housing. Also shown are the shift cylinders 114 and 115 for shifting the clutches C2 and C3 via respective mechanical linkages 116 and 117, such shift cylinders being conveniently mounted to a side of the housing 33. The high pressure manifold assembly also can be seen mounted to the housing at 118. In addition, the gear assembly for the power take-off 40 is seen at 119, such assembly being mechanically connected to the input drive shaft and particularly the gear 62 by suitable gearing through an opening 121 in the wall of the housing.

Figure 18:
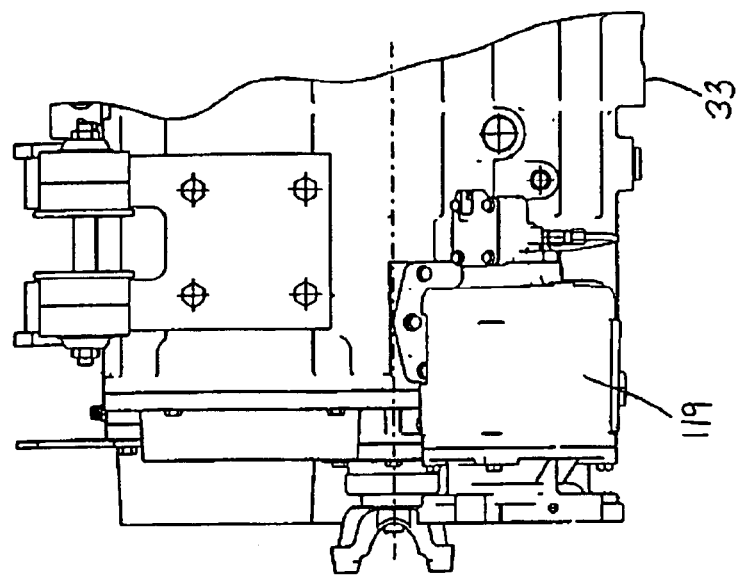
FIG. 18 is a fragmentary side elevational view of the transmission assembly, looking from the arrow X of FIG. 13.
Figure 17:
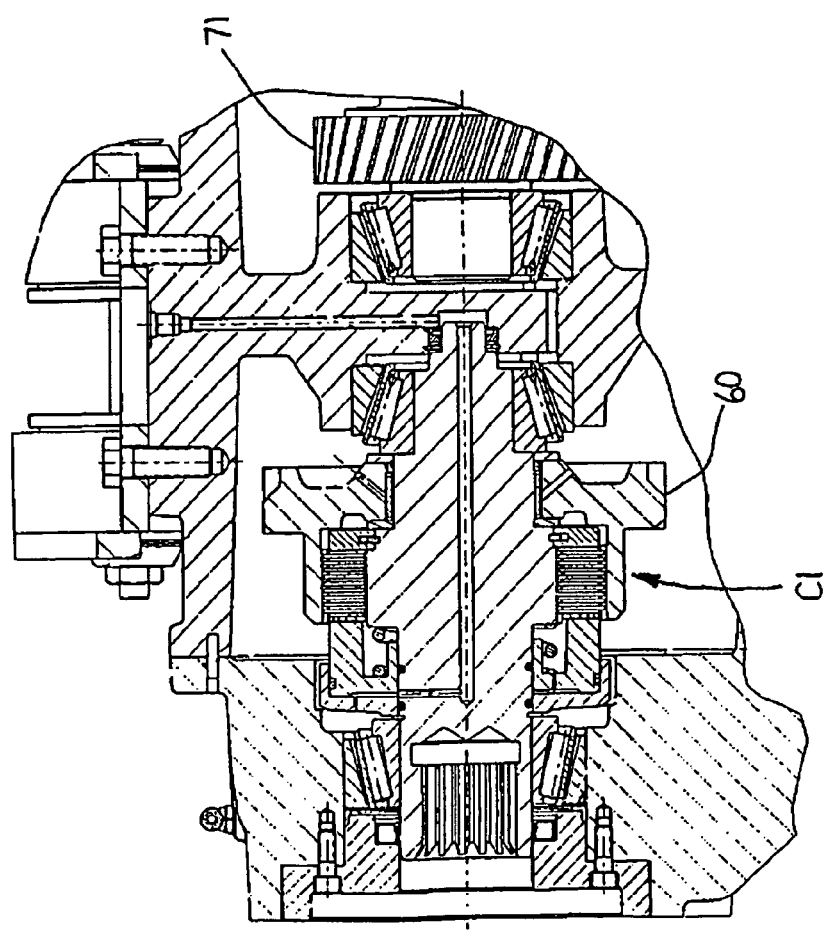
FIG. 17 is a fragmentary cross-sectional view of the transmission assembly, taken along the line D-D of FIG. 13.

In FIGS. 14-17, details of the clutches C1, C2 and C3 can be seen. The manner in which the power input shaft and output drive shaft also can be seen. In FIG. 18, the power take-off gear box is further illustrated.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power transfer apparatus for a vehicle comprising a housing having an axis; a power input shaft at one axial end of the housing that is connectable to a prime mover of the vehicle for receiving power from the prime mover; an output drive shaft at an opposite axial end of the housing that is connectable to one or more wheels of the vehicle for transfer of power to the one or more wheels; a primary hydraulic pump mounted to an axial end of the housing; a hydraulic motor mounted to an axial end of the housing; a transmission assembly contained within the housing, the transmission assembly including a pump coupling for coupling the primary hydraulic pump to the power input shaft, and a motor coupling for coupling the hydraulic motor to the output drive shaft; and a secondary hydraulic pump mounted to an axial end of the housing, and the transmission assembly includes a secondary pump coupling for coupling the secondary hydraulic pump to the power input shaft.

2. An apparatus as set forth in claim 1, wherein the primary hydraulic pump and motor have respective rotational drive shafts extending parallel to the power input and output drive shafts.

3. An apparatus as set forth in claim 1, wherein the housing includes flow passages connected to a fluid output of the secondary hydraulic pump.

4. An apparatus as set forth in claim 3, wherein the transmission assembly includes a mechanical transmission connected between the hydraulic motor and the output drive shaft, the mechanical transmission having one or more gear ratios and a clutch for shifting the mechanical transmission, and wherein the clutch is operated by a fluid pressure device to which pressure fluid is supplied from the secondary hydraulic pump.

5. A vehicle comprising a prime mover, at least one wheel, and an apparatus as set forth in claim 1, wherein the prime mover is drivingly connected to the power input shaft, and the output drive shaft is drivingly connected to at least one wheel of the vehicle.

6. A vehicle as set forth in claim 5, wherein the prime mover is an internal combustion engine.

7. A vehicle as set forth in claim 5, wherein the vehicle includes an energy storage device in which energy can be stored, primary hydraulic pump power circuitry for transferring hydraulic power from the primary hydraulic pump to the energy storage device, and hydraulic motor power circuitry for transferring energy from the energy storage device to the hydraulic motor.

8. A vehicle as set forth in claim 7, wherein the hydraulic motor is reversely operable as a hydraulic pump when driven by the output drive shaft, and the hydraulic motor power circuitry is operable to transfer hydraulic power from the hydraulic motor to the energy storage device when the hydraulic motor is operated as a hydraulic pump.

9. An apparatus as set forth in claim 1, wherein the primary hydraulic pump and hydraulic motor are mounted to opposite second axial ends of the housing.

10. An apparatus as set forth in claim 1, wherein the housing encloses an interior space containing the transmission assembly, and the housing has a wall provided with an opening through which a power takeoff device can be coupled to the transmission.

11. A power transfer apparatus for a vehicle comprising a housing having an axis; a power input shaft at one axial end of the housing that is connectable to a prime mover of the vehicle for receiving power from the prime mover; an output drive shaft at an opposite axial end of the housing that is connectable to one or more wheels of the vehicle for transfer of power to the one or more wheels; a primary hydraulic pump mounted to an axial end of the housing; a hydraulic motor mounted to an axial end of the housing; and a transmission assembly contained within the housing, the transmission assembly including a pump coupling for coupling the primary hydraulic pump to the power input shaft, and a motor coupling for coupling the hydraulic motor to the output drive shaft; and wherein the housing has on an axial side thereof a pump mounting surface against which the primary hydraulic pump is removably sealingly mounted, and the housing has on an axial side thereof a motor mounting surface to which the hydraulic motor is removably sealing mounted.

12. An apparatus as set forth in claim 11, wherein a plurality of hydraulic motors are each mounted to an axial end of the housing.

13. An apparatus as set forth in claim 11, further comprising an energy storage device in which energy can be stored, and primary hydraulic pump power circuitry for transferring hydraulic power from the primary hydraulic pump to the energy storage device.

14. An apparatus as set forth in claim 13, further comprising hydraulic motor power circuitry for transferring energy from the energy storage device to the hydraulic motor.

15. An apparatus as set forth in claim 14, wherein the hydraulic motor is reversely operable as a hydraulic pump when driven by the output drive shaft, and the hydraulic motor power circuitry is operable to transfer hydraulic power from the hydraulic motor to the energy storage device when the hydraulic motor is operated as a hydraulic pump.

16. An apparatus as set forth in claim 15, where the energy storage device includes at least one hydropneumatic accumulator, and the primary hydraulic pump power circuitry and hydraulic motor power circuitry includes hydraulic circuits respectively connecting the primary hydraulic pump and hydraulic motor to the at least one hydropneumatic accumulator.

17. An apparatus as set forth in claim 11, wherein the transmission assembly includes a clutch for selectively drivingly connecting the primary hydraulic pump to the power input shaft.

18. An apparatus as set forth in claim 11, wherein the transmission assembly includes a clutch for selectively drivingly connecting the output drive shaft to the power input shaft.

19. An apparatus as set forth in claim 18, wherein the ratio of connection by the clutch is one-to-one.

20. An apparatus as set forth in claim 11, wherein two said hydraulic motors are mounted at respective mounting surfaces on the same axial side of the housing at opposite sides of a center plane through the housing coplanar with the power input and output drive shafts.

21. An apparatus as set forth in claim 11, wherein the primary hydraulic pump and hydraulic motor are mounted to opposite second axial ends of the housing.

22. An apparatus as set forth in claim 11, further comprising an energy storage device in which energy can be stored, and wherein the energy storage device is charged by one or more of the primary hydraulic pump, the hydraulic motor upon reverse driving by the output shaft, and a further pump driven by the output shaft.

23. An apparatus as set forth in claim 11, wherein the transmission assembly includes a mechanical transmission connected between the hydraulic motor and the output drive shaft, the mechanical transmission has at least one gear ratio and a clutch for shifting into or between multiple gear ratios.

24. An apparatus as set forth in claim 11, wherein the transmission assembly includes a mechanical transmission connected between the power input shaft and the output drive shaft, the mechanical transmission having a clutch for engaging and disengaging the power input shaft and output drive shaft.

25. An apparatus as set forth in claim 11, wherein the housing encloses an interior space containing the transmission assembly, and the housing has a wall provided with an opening through which a power takeoff device can be coupled to the transmission.

26. An apparatus as set forth in claim 11, further comprising an energy storage device in which energy can be stored, and wherein the energy storage device is charged by the hydraulic motor upon reverse driving by the output shaft.

27. A vehicle comprising:

a power transfer apparatus including a housing having an axis, a power input shaft at one axial end of the housing that is connectable to a prime mover of the vehicle for receiving power from the prime mover, an output drive shaft at an opposite axial end of the housing that is connectable to one or more wheels of the vehicle for transfer of power to the one or more wheels, a primary hydraulic pump mounted to an axial end of the housing, a hydraulic motor mounted to an axial end of the housing, a transmission assembly contained within the housing, the transmission assembly including a pump coupling for coupling the primary hydraulic pump to the power input shaft, and a motor coupling for coupling the hydraulic motor to the output drive shaft;

an energy storage device in which energy can be stored;

primary hydraulic pump power circuitry for transferring hydraulic power from the primary hydraulic pump to the energy storage device; and hydraulic motor power circuitry for transferring energy from the energy storage device to the hydraulic motor;

wherein the hydraulic motor is reversely operable as a hydraulic pump when driven by the output drive shaft, and the hydraulic motor power circuitry is operable to transfer hydraulic power from the hydraulic motor to the energy storage device when the hydraulic motor is operated as a hydraulic pump; and wherein the transmission assembly includes a first clutch for selectively drivingly connecting the output drive shaft to the power input shaft, and a second clutch for selectively drivingly connecting the hydraulic motor to the output drive shaft, and further comprising a controller for controlling the first and second clutches for selective connection of the power input shaft to the output shaft for driving the vehicle's wheel or wheels under highway speed conditions, and for connecting the hydraulic motor to the output drive shaft for driving the output shaft in a hydrostatic mode and for energy recovery during braking when the hydraulic motor acts as pump for supplying energy to the energy storage device.

28. A vehicle as set forth in claim 27, wherein the transmission assembly comprises a third clutch for selectively drivingly connecting the primary hydraulic pump to the power input shaft; and wherein when the first clutch is disengaged the controller is operative to control the third clutch and the speed of the engine for enabling the engine to be operated at an optimal speed for recharging the energy storage device during operation of the vehicle at low speeds, or to be shut off when the energy storage device are sufficiently charged.

29. A vehicle as set forth in claim 27, wherein the energy storage device includes at least one hydropneumatic accumulator.

30. A vehicle as set forth in claim 27, wherein the primary hydraulic pump and hydraulic motor are mounted to opposite second axial ends of the housing.

31. A vehicle as set forth in claim 27, wherein the transmission assembly includes a third clutch for selectively drivingly connecting the primary hydraulic pump to the power input shaft.

32. A vehicle as set forth in claim 31, wherein the primary hydraulic pump and hydraulic motor are mounted to opposite second axial ends of the housing.

33. A vehicle as set forth in claim 27, wherein the output drive shaft is driven at low vehicle speeds with high torque in the hydrostatic mode.

34. An apparatus as set forth in claim 27, wherein the housing encloses an interior space containing the transmission assembly, and the housing has a wall provided with an opening through which a power takeoff device can be coupled to the transmission.

* * * * *

UNITED STATES PATENT AND TRADEMARK OFFICE
CERTIFICATE OF CORRECTION

PATENT NO. : 7,597,172 B1
APPLICATION NO. : 11/379883
DATED : October 6, 2009
INVENTOR(S) : Kovach et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Twenty-eighth Day of September, 2010

David J. Kappos
*Director of the United States Patent and Trademark Office*